(12) United States Patent
Fenech et al.

(10) Patent No.: US 8,023,887 B2
(45) Date of Patent: Sep. 20, 2011

(54) TELECOMMUNICATION NETWORK

(75) Inventors: Hector Fenech, Issy les Moulineaux (FR); Emmanuel Lance, Clichy (FR)

(73) Assignee: Eutelsat SA, Paris (FR)

( * ) Notice: Subject to any disclaimer, the term of this patent is extended or adjusted under 35 U.S.C. 154(b) by 630 days.

(21) Appl. No.: 12/215,052

(22) Filed: Jun. 23, 2008

(65) Prior Publication Data
US 2009/0270088 A1 Oct. 29, 2009

(30) Foreign Application Priority Data

Apr. 28, 2008 (FR) ...................................... 08 52861

(51) Int. Cl.
| | |
|---|---|
| H04B 7/185 | (2006.01) |
| H04H 20/74 | (2008.01) |
| H04W 4/00 | (2009.01) |
| H01Q 19/06 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04N 7/20 | (2006.01) |

(52) U.S. Cl. ... 455/12.1; 455/3.02; 455/427; 455/435.1; 342/352; 342/354; 343/753; 370/235; 370/316; 370/323; 725/63

(58) Field of Classification Search ................ 455/3.02, 455/12.1, 13.1, 13.2, 13.3, 427, 428, 429, 455/435.1; 342/352, 354, 356, 357.2, 357.42, 342/357.64; 370/235, 307, 310, 316, 319, 370/321, 323, 516; 725/63, 64; 343/753, 343/766
See application file for complete search history.

(56) References Cited

U.S. PATENT DOCUMENTS 3,123,771 A * 3/1964 Poole et al. ..................... 455/20
(Continued)

FOREIGN PATENT DOCUMENTS

EP 1 085 680 A 3/2001

OTHER PUBLICATIONS

Frederic Andre et al.: "Flexible TWT Amplifier for Space Applications," Thales Electron Devices, 2003, pp. 48-50.

*Primary Examiner* — Andrew Wendell
*Assistant Examiner* — Paul P Tran
(74) *Attorney, Agent, or Firm* — Davidson, Davidson & Kappel, LLC

(57) ABSTRACT

The present invention concerns a telecommunication network for establishing radiofrequency links between at least one gateway and ground terminals via a multispot telecommunication satellite. The network includes a service zone composed of a plurality of cells each including a plurality of ground terminals, the said service zone being split into N sub-zones, N being an integer strictly greater than 1, each sub-zone having a capacity profile evolving in time over a given period and presenting a maximum value, the said maximum values of each of the capacities being shifted with regard to time and a multispot satellite including a transponder including amplification of the signals emitted by the gateway on the forward link and the signals emitted by the cells on the return link and a continuous power supply system of the amplifier. The said supply system includes means for supplying the amplifier providing the whole of the sub-zones with their respective capacity profile evolving over the said given period, the maximum continuous power delivered by the supply system being less than the continuous power which the amplifier would consume to provide simultaneously the whole of the sub-zones with their maximum capacity value.

8 Claims, 5 Drawing Sheets

U.S. PATENT DOCUMENTS

| | | | |
|---|---|---|---|
| 4,500,984 A * | 2/1985 | Shimbo et al. | 370/201 |
| 5,708,965 A * | 1/1998 | Courtney | 455/13.4 |
| 5,826,170 A * | 10/1998 | Hirschfield et al. | 455/13.4 |
| 6,073,011 A * | 6/2000 | Horstein | 455/427 |
| 2002/0009060 A1 | 1/2002 | Gross | |
| 2002/0032003 A1 * | 3/2002 | Avitzour et al. | 455/12.1 |
| 2003/0096610 A1 | 5/2003 | Courtney | |
| 2004/0092227 A1 * | 5/2004 | Sarraf et al. | 455/12.1 |
| 2006/0072452 A1 * | 4/2006 | Olariu et al. | 370/229 |
| 2007/0155318 A1 * | 7/2007 | Monte et al. | 455/12.1 |
| 2008/0233865 A1 * | 9/2008 | Malarky et al. | 455/12.1 |
| 2010/0144346 A1 * | 6/2010 | Malomsoky et al. | 455/434 |

\* cited by examiner

TELECOMMUNICATION NETWORK

This claims priority to French Patent Application FR 08/52861, filed Apr. 28, 2008, the entire disclosure of which is incorporated by reference herein.

BACKGROUND

The present invention concerns a telecommunication network for establishing radiofrequency links between gateways and ground terminals via a multispot telecommunication satellite. This type of satellite allows the use of several spot beams from antennas on board the satellite to cover contiguous geographical zones or cells, instead of a single broad spot beam.

Such multispot satellites allow several radiofrequency links to be established occupying the same frequency band on different spot beams.

In the case of a high bandwidth broadband satellite telecommunication system, the satellite is used in a bidirectional manner, i.e. at the same time for:

relaying data emitted by a gateway (linked to the ground network) towards a plurality of ground terminals: this first link of the point-multipoint type constitutes the forward link;

relaying towards the gateway the data emitted by the ground terminals: this second link, of the multipoint-point type, constitutes the return link.

It will be noted that a satellite broadcasting service can be considered as equivalent to the forward link of a bidirectional system such as described above.

An example of forward link in a multispot telecommunication network configuration is illustrated in FIG. 1.

Signals are sent towards a multispot satellite 3 on an uplink LM by a gateway 2 (also designated the central station) such as a ground gateway connected to an internet backbone 5. The gateway controls the network by the means of a management system of the network which allows the operator to supervise and monitor all the components of the network. The signals sent by the gateway are then processed at the level of the satellite 3 which amplifies them, derives them at a generally lower frequency then retransmits them from the satellite antenna or antennae on a downlink LD in the form of a plurality of spot beams forming elementary covering zones or cells C1 to C8 in which ground terminals 6 are situated. Each cell C1 to C8 is associated with a spot beam SP1 to SP8. It will be noted that in the case of configuration 1, the eight cells C1 to C8 associated respectively to the eight spot beams SP1 to SP8 form a group of cells served by the same gateway 2. In practice, the network 1 is formed by a plurality of gateways connected with each other via a ground network (Internet network for example). The return link of the ground terminals 6 towards the gateway 2 functions in an identical manner with an inverse direction of communication.

The coordination of the frequencies between operators is carried out within the framework of a regulation decreed by the International Union of Telecommunications (IUT): thus, by way of example, the Ka band for Region 1 (Europe, Africa, Middle East) is defined in Table 1 below:

TABLE 1

| Forward link | Uplink (of the gateway) | 27.5 GHz to 29.5 GHz |
|---|---|---|
|  | Downlink (towards the ground terminals) | 19.7 GHz to 20.2 GHz |
| Return link | Uplink (of the ground terminals) | 29.5 GHz to 30.0 GHz |
|  | Downlink (towards the gateway) | 17.7 GHz to 19.7 GHz |

It is observed that the spectra of the band Ka in uplink are adjacent (i.e. the intervals [27.5; 29.5] and [29.5; 30] present no discontinuity). The same applies to the spectra of band Ka in downlink (i.e. the intervals [17.7; 19.7] and [19.7; 20.2] present no discontinuity).

Given that the gain of an antenna is inversely proportional to the opening of the spot beam, a way of covering an extensive zone with a homogeneous and high gain is to use multispot antennae. For a given service zone, the greater the number of spot beams, the smaller the opening of each spot beam will be. Thus, the gain on each spot beam and hence the gain on the service zone to be covered will be increased. As we have mentioned above, a service zone to be covered is formed by a plurality of contiguous cells (elementary covering zones), a spot beam being associated with each cell; however, it is possible that a part of a service zone is disconnected from the others (an island, for example), and that the associated cell is disconnected from the other cells constituting the remainder of the service zone. A homogeneous multispot covering zone SA is represented in FIG. 2a), each cell being represented by a hexagon FH such that the covering zone is composed of a plurality of hexagons FH in which $\theta_{cell}$ is the external dimension of the cell expressed by the angle of the satellite associated with the covering. However, the antenna spot beam associated with each cell is not capable of producing a hexagonal shape, a good approximation consisting in considering a plurality of circular spot beams FC such as represented in FIG. 2b). The association of a spot beam with a cell is carried out taking into account the best performances of the satellite for said spot beam, in particular in terms of EIRP (Effective Isotropic Radiated Power) and of merit factor G/T (ratio gain over noise temperature): a cell is determined as the part of the service zone associated with the spot beam offering the highest gain on this zone from all the spot beams of the satellite.

Configuration 1, as represented in FIG. 1, uses a technique designated frequency re-use: this technique allows the same range of frequencies to be used several times in the same satellite system so as to increase the total capacity of the system without increasing the allocated bandwidth.

Frequency re-use schemes are known, designated as colour schemes, making a colour correspond to each of the spot beams of the satellite. These colour schemes are used to describe the allocation of a plurality of frequency bands to the spot beams of the satellite with a view to radiofrequency transmissions to be realized in each of these spot beams. In these schemes, each colour corresponds to one of these frequency bands.

In addition, these multispot satellites allow polarised transmissions to be emitted (and received): the polarisation can be linear (in this case the two directions of polarisation are respectively horizontal and vertical) or circular (in this case the two directions of polarisation are respectively circular left or circular right). It will be noted that in the example of FIG. 1, the uplink leaving the gateway 2 uses two polarisations with four channels for each polarisation, respectively Ch1 to Ch4 for the first polarisation and Ch5 to Ch8 for the second polarisation: the use of two polarisations allows the total number of gateways to be reduced. The eight channels Ch1 to Ch8, after processing by the payload of the satellite 3 will form the eight spot beams SP1 to SP8 (one channel being associated with one spot beam in this example).

According to a scheme with four colours (red, yellow, blue, green) with a frequency spectrum of 500 MHz for each polarisation, the transmissions being polarised in one of the two polarisation directions: circular right or circular left, each colour is associated with a band of 250 MHz and a polarisation direction. Within the framework of the invention, the use of a scheme with four colours is an example; any number of colours greater than three can be suitable; however, if one wishes to use to the best the isolation permitted by the use of the two polarisations, a number of colours which is a multiple of two is necessary.

In the whole of the following description, we will take the following convention:

the colour red is represented by hatched lines toward the right;

the colour yellow is represented by dense points;

the colour blue is represented by hatched lines toward the left;

the colour green is represented by dispersed points.

A colour is thus associated with each spot beam of the satellite (and hence a cell) so that the spot beams of a same "colour" are non-adjacent: the contiguous cells therefore correspond to different colours.

An example of a scheme with four colours for the coverage of Europe is represented in FIG. 3. In this case, 80 cells are necessary to cover Europe.

This type of scheme is equally applicable in uplink and in downlink. At the satellite level, the creation of a spot beam is made from a feedhorn radiating towards a reflector. A reflector can be associated with a colour so that a coverage with four colours is ensured by four reflectors. In other words, the generation of 16 spot beams of each gateway can be carried out via the use of four antennae (one per colour) each having a reflector, four feedhorns being associated with each reflector.

FIG. 4 illustrates a frequency plan broken down into an uplink frequency plan PMVA on the forward link, a downlink frequency plan PDVA on the forward link, an uplink frequency plan PMVR on the return link and a downlink frequency plan PDVR on the return link. The notations RHC and LHC designate respectively the right and left circular directions of polarisation.

The PMVA plan corresponding to the uplink on the forward link (of the gateway to the satellite) has 2 GHz (of 27.5 to 29.5 GHz) available frequency spectrum so that 16 channels of 250 MHz band pass are generated by a gateway (8 channels for each polarisation). These 16 channels, after processing by the payload of the satellite will form 16 spot beams. The hypothesis made here consists in considering that the entire spectrum of 2 GHz is used: it will be noted, however, that it is equally possible, in particular for operational reasons, to use only one part of the spectrum and to generate fewer channels. In the example above, 16 spot beams (and hence 16 cells) are generated from two signals multiplexing the 8 channels (a signal multiplexed by polarisation) generated by a gateway. Each multiplexed signal corresponding to a polarisation is then processed at the level of the transponder of the satellite so as to provide 8 spot beams; each of these eight spot beams is associated with a frequency interval from the two frequency intervals [19.7; 19.95] and [19.95; 20.2] and an RHC or LHC polarisation as represented on the downlink frequency plan PDVA.

The PDVR plan corresponding to the downlink on the return link (of the satellite to the gateway) has 2 GHz (of 17.7 to 19.7 GHz) available frequency spectrum so that 16 spot beams of 250 MHz band pass (associated with a frequency interval from the two frequency intervals [29.5; 29.75] and [29.75; 30] and an RHC or LHC polarisation as represented on the downlink frequency plan PMVR) issued from the cells are multiplexed at the level of the satellite in two signals (corresponding to each polarisation) to be returned towards the gateway (8 channels for each polarisation). We will still make the hypothesis that the whole of the spectrum of 2 GHz is used. Thus, in the case of Europe with a spectrum of 2 GHz used, one has a number of $N_c$ cells equal to 80 and a number of active gateways $N_{GWactive}$ equal to 5 (namely the number 80 of cells divided by the number 16 of spot beams). It will be noted that if it may be that a part of the band is not usable, for example the part going from 17.7 to 18.45 GHz in the return link and the part going from 27.5 to 28.25 GHz in the forward link: in this case, the number of channels Ns per polarisation is equal to 5: consequently, the number of cells still being equal to 80 for Europe, the number of active gateways $N_{GWactive}$ becomes equal to 5. In any case, the number of gateways $N_{GWactive}$ is still greater than the number $N_c$ of cells of the covering zone.

For the return link, each spot beam is associated with one of the following colours:

a colour red corresponding to a first band of 250 MHz (lower part of the available spectrum of 500 MHz) and to the circular right polarisation direction;

a colour yellow corresponding to the same first band of 250 MHz and to the circular left polarisation;

a colour blue corresponding to a second band of 250 MHz (upper part of the available spectrum of 500 MHz) and to the circular right polarisation direction;

a colour green corresponding to the same second band of 250 MHz and to the circular left polarisation direction.

The four adjacent spot beams of a same pattern are each associated with a different colour.

On the return link, the polarisations are inverted so that the colours red and yellow have a circular left polarisation and the colours blue and green have a circular right polarisation. The ground terminals emit and receive according to an inverse polarisation so that one can easily separate the uplink signals from the downlink signals: such a configuration allows less costly terminals to be used.

The payload of the satellite designates the part which allows it to fulfil the mission for which it was designed, i.e. for a telecommunication satellite 3 such as that shown in FIG. 1, to ensure the reception, processing (frequency conversion, filtering, amplification) and re-emission of the telecommunication signals issued from the gateway 2. The payload essentially includes the antennae of the satellite and the transponders (and not the equipment for control, propulsion or electrical power supply which belong to the platform of the satellite).

FIG. 5 shows in a known manner a functional block diagram of an architecture of payload 10 in forward link (from the gateways to the cells including the ground terminals) with multispot emission on the downlink.

After reception and selection of the polarisation, $2N_{GW}$ multiplexed signals (in the example quoted above, $N_{GW}$ signals of 8 channels for each of the two polarisations) received from $N_{GW}$ gateways (or gateway) are each amplified by a LNA low noise amplifier 12. Each signal is then separated into $N_c$ uplink channels by a signal divider device (demultiplexer) 13. The $N_c$ uplink channels are then translated in frequency by a frequency converter circuit 14 generally formed by a local oscillator and are filtered by an input filter 15 (of the pass band filter type) so as to form $N_c$ channels in accordance with the frequency plan of the downlink on the forward link (PDVA). The local oscillator is most often constituted by a voltage controlled quartz VCO (Voltage Controlled Oscillator) with a phase lock loop. The $N_c$ translated frequency channels are amplified through a power amplifier 16 HPA (High Power Amplifier) generally formed by a channel amplifier 17 CAMP (Channel AMPlifier) and a travelling wave tube amplifier 18 TWTA forming $N_c$ downlink spot beam signals. Each of the $N_c$ spot beam signals is then filtered through an output pass band filter 19, and is then sent on a source 20 such as a radiating feedhorn towards a reflector for the formation of a spot beam. According to this configuration, the payload 10 includes:

- $2N_{GW}$ low noise amplifiers 12 LNA;
- $2N_{GW}$ signal divider devices 13;
- $N_c$ frequency converter circuits 14;
- $N_c$ input filters 15;
- $N_c$ high power amplifiers 16 HPA;
- $N_c$ output pass band filters 19.

FIG. 6 shows in a known manner a functional block diagram of an architecture of payload 100 in return link (from cells including the ground terminals to the gateways) with multispot emission on the uplink.

$N_c$ signals received of $N_c$ cells including the user terminals are each amplified by a LNA low noise amplifier 12. Each signal is then translated in frequency by a frequency converter circuit 114 generally formed by a local oscillator and filtered by an input filter 115 (of the pass band filter type) so as to form $N_c$ channels in accordance with the downlink frequency plan on the return link (PDVR). As previously, the local oscillator is most often constituted by a voltage controlled quartz VCO with a phase lock loop. The channels intended for the same gateway (for the same polarisation) are then regrouped to form a multiplexed signal via a multiplexer 113 (with $N_c$ inputs and $2N_{GW}$ outputs): the structure of this multiplexed signal is identical to that of a signal emitted by a gateway towards the satellite on the uplink in forward link. One therefore has $2N_{GW}$ output signals of the multiplexer 113. Each of the $2N_{GW}$ signals is amplified through a power amplifier 116 HPA generally formed by a channel amplifier 117 CAMP and a travelling wave tube amplifier 118 TWTA forming $2N_{GW}$ downlink signals in return link. Each of the $2N_{GW}$ downlink signals in return link is then filtered through an output pass band filter 119, then sent on a source 120 such as a radiating feedhorn towards a reflector for the formation of the $2N_{GW}$ signals with the destination of the $N_{GW}$ gateways. According to this configuration, the payload 100 includes:

- $N_c$ low noise amplifiers 12 LNA;
- $N_c$ frequency converter circuits 114;
- $N_c$ input filters 115;
- a multiplexer device 113 with $N_c$ inputs and $2N_{GW}$ outputs;
- $2N_{GW}$ power amplifiers 116 HPA;
- $2N_{GW}$ output pass band filters 119.

SUMMARY OF THE INVENTION

It will be noted that the channel amplifiers 17 and/or 117 are generally gain control amplifiers which allow the level of power of the signals to be regulated at input of the travelling wave tubes 18 and/or 118. The tubes 18 and/or 118 can be replaced by solid state power amplifiers SSPA. It is likewise possible to use more sophisticated architectures including devices of the MPA type (Multiport Amplifier), offering more flexibility.

It is deduced from the above that the plurality of the forward link and the return link involves a set of power amplifiers 16 and 116 capable of serving $N_c + 2N_{GW}$ downlinks.

It is an object of the present invention to provide a telecommunication network for establishing radiofrequency links between gateways and ground terminals via a multispot satellite, said network including a service zone composed of cells including said ground terminals and functioning with a satellite presenting a "dry" mass (i.e. mass of the satellite without the fuel) which is reduced compared with a satellite according to the prior art, complying with identical capacity requirements of users. The term "capacity" is understood to mean the capacity in terms of flow of data sent to the users (in forward link) or transmitted by the users (in return link). This capacity can be expressed in bits per second or can be normalised if one is concerned with its evolution over time (it then becomes a variable without unit).

To this end, the invention proposes a telecommunication network for establishing radiofrequency links between at least one gateway and ground terminals via a telecommunication satellite having several spot beams, designated multispot satellite, said network including:

a service zone composed of a plurality of cells each including a plurality of ground terminals, said service zone being split into N sub-zones, N being an integer strictly greater than 1, each sub-zone having a capacity profile evolving in time over a given period and presenting a maximum value, said maximum values of each of the capacities being shifted with regard to time, a multispot satellite including:
  a transponder including amplification means of the signals emitted by the said gateway on the forward link and the signals emitted by the said cells on the return link,
  a continuous power supply system of said amplification means, the said network being characterized in that the said supply system includes means for supplying the said amplification means providing the whole of the sub-zones with their respective capacity profile evolving over the said given period, the maximum continuous power delivered by the said supply system being less than the continuous power which the said amplification means would consume to provide simultaneously the whole of the sub-zones with their maximum capacity value.

A gateway is understood to mean any central station such as a ground gateway linked to an internet backbone. The gateway sends on a forward link signals which are then processed at the level of the satellite which amplifies them, derives them at a different frequency (generally lower) then retransmits them from the satellite antenna or antennae on a downlink in the form of a plurality of spot beams forming elementary covering zones or cells in which ground terminals are situated.

Owing to the invention, the capacity profiles evolving in time may be used advantageously over a given period (24 h in the case of different time zones) and having a capacity peak shifted with regard to time with respect to each other. Rather than dimensioning the supply system so that it delivers a continuous power necessary for the supply of the amplifiers to provide simultaneously all of the capacity peaks, the network according to the invention uses a supply system which is dimensioned to provide a lower continuous power due to the staggering of the capacity peaks. The invention therefore utilizes the fact that the supply systems used in the networks according to the prior art are over-dimensioned.

The network according to the invention therefore allows the mass of the supply system to be reduced and hence the "dry" mass of the satellite. By way of example, considering a satellite taking on board approximately 70 travelling wave tube amplifiers (with a platform having a dry mass of 1700 kg and a payload having a dry mass of 750 kg), the invention allows a saving of 25% on the energy supply system (formed essentially by solar panels and batteries) with three time zones (N=3). A supply system dimensioned for such a payload in full power will have an initial dry mass of 600 kg; the invention will therefore allow a saving of 150 kg on the dry mass of the satellite (i.e. 9% of the dry mass of the platform or 6% of the total dry mass of the satellite) using a supply system having a dry mass of 450 kg. From this saving of dry mass, two options are possible:

the first option consists in having more fuel to return to the same total mass of the satellite (with the fuel) as that of a satellite used in a network according to the prior art. This first option allows a gain in the lifespan of the satellite mission. Typically, on a satellite, a supplement of 150 kg of fuel involves 3, even 4 additional years of life.

The second option consists in reducing the total mass of the satellite by 150 kg, which allows the launching costs to be reduced. Such an option is particularly advantageous in the case of a launch where the operator of the satellite pays as a function of the mass to be launched into orbit.

It will be noted that the invention applies more particularly to the case of sub-zones distributed over different time zones; however, it is equally possible to use a network according to the invention for sub-zones with users having habits or lifestyles which are different from one sub-zone to another so that the capacity profiles are different and the peaks of these profiles are shifted with regard to time.

The network according to the invention can equally present one or several of the following characteristics, considered individually or according to all technically possible combinations:

each of the N sub-zones corresponds to a time zone, said given period being a period of 24 hours;

each of the N sub-zones has a capacity profile adapted to the way of life of the population using the ground terminals of the said sub-zone;

the said amplification means are formed by a plurality of travelling wave tube amplifiers, each of the said amplifiers functioning at saturation when it must provide a maximum capacity;

the said amplification means are formed by a plurality of travelling wave tube amplifiers, each of said amplifiers operating in back off mode with respect to its saturation mode when it must provide a maximum capacity;

the said amplification means are formed by a plurality of travelling wave tube amplifiers of constant efficiency;

the said radiofrequency links are established between a plurality of gateways and the said service zone so that the cells served by the same gateway are distributed over the said N sub-zones.

The present invention also provides a method for dimensioning said supply system belonging to a network according to the invention, the N capacity profiles being defined by a curve $C_i(t)$ with i varying from 1 to N and t evolving over the said given period, the said method including the following stages:

sum of the N profiles $C_i(t)$ so that one obtains a global capacity profile $$C(t) = \sum_{1}^{N} C_i(t)$$

determination of the maximum value $C_{max}$ taken by the said global capacity profile C(t);

determination of the said maximum continuous power delivered by the said supply system, the said power being greater than or equal to the continuous power which the said amplification means would consume to provide simultaneously the said service zone with the said maximum value $C_{max}$.

The present invention also provides a multispot satellite including a supply system dimensioned by a method according to the invention.

BRIEF DESCRIPTION OF THE DRAWINGS

Other characteristics and advantages of the invention will become clearly apparent from the description given thereof below, by way of indication and in no way restrictive, with reference to the attached figures, in which.

In all the figures, the common elements bear the same reference numbers.

DETAILED DESCRIPTION

Figure 1:
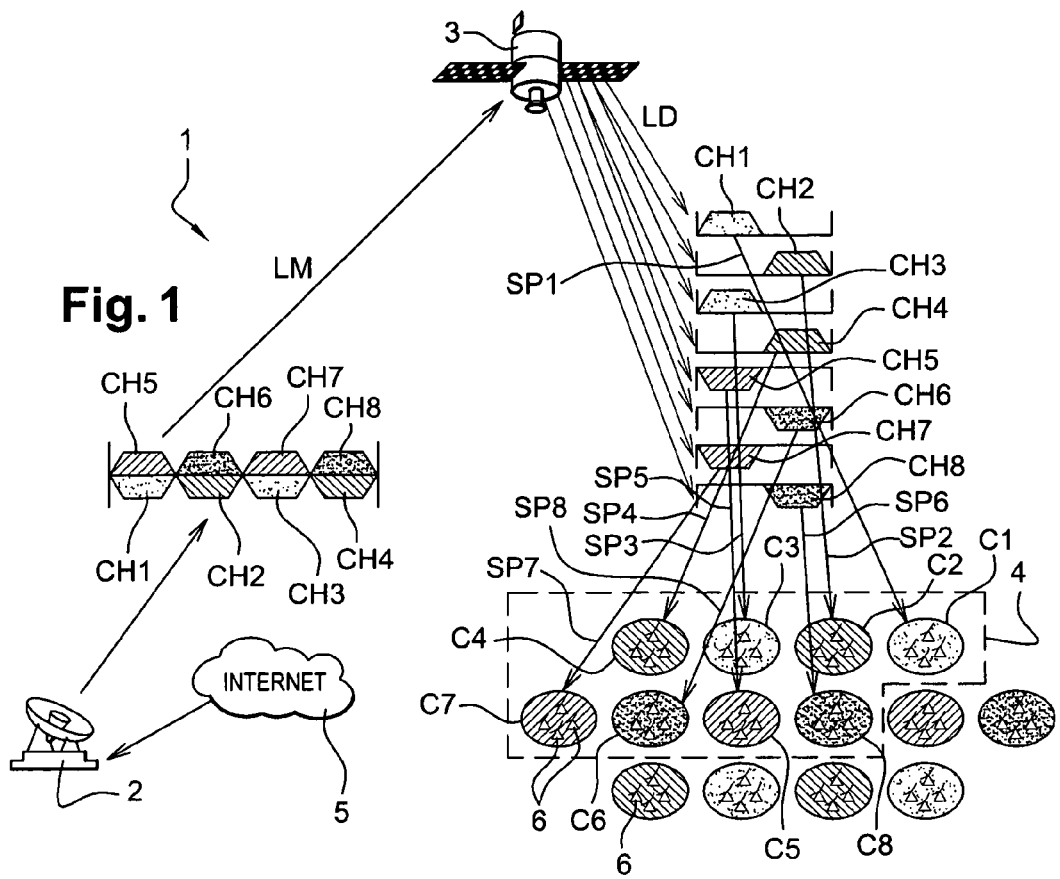
FIG. 1 is a simplified diagrammatic representation of a multispot configuration.
Figure 2:
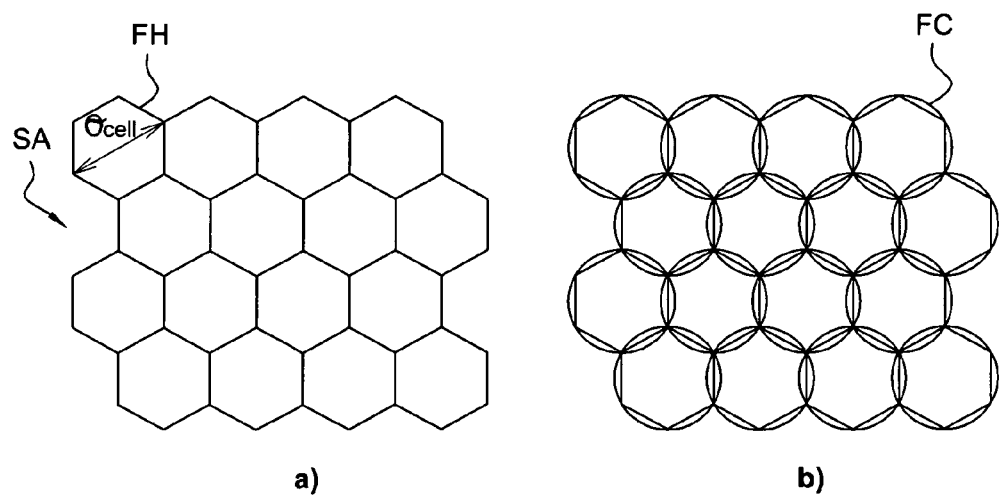
FIG. 2a) represents an example of covering zone composed of a plurality of adjacent hexagons.
FIG. 2b) represents an approximation of the covering zone of FIG. 2a) composed of a plurality of circular spot beams.
Figure 3:
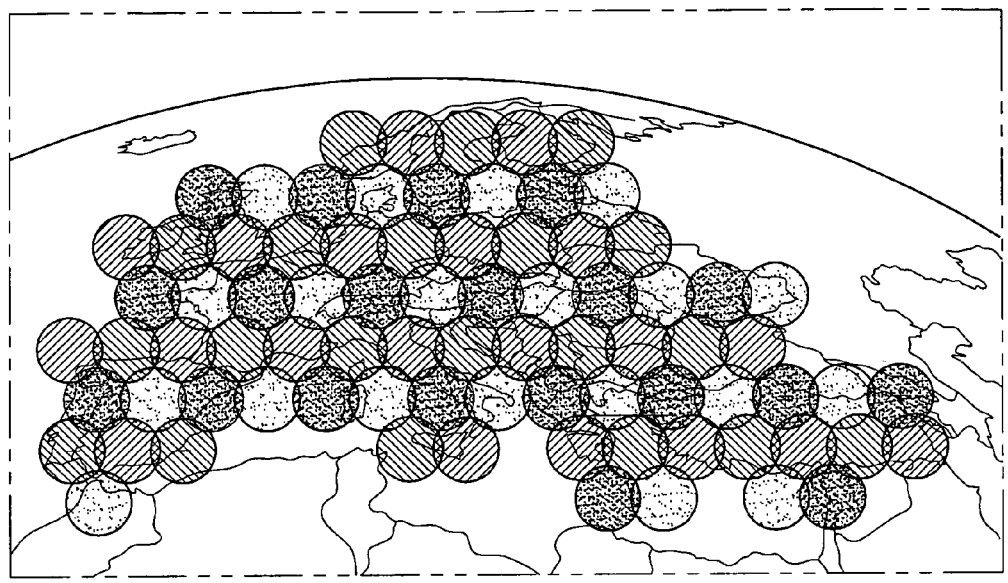
FIG. 3 illustrates a scheme with four colours for the coverage of Europe.
Figure 4:
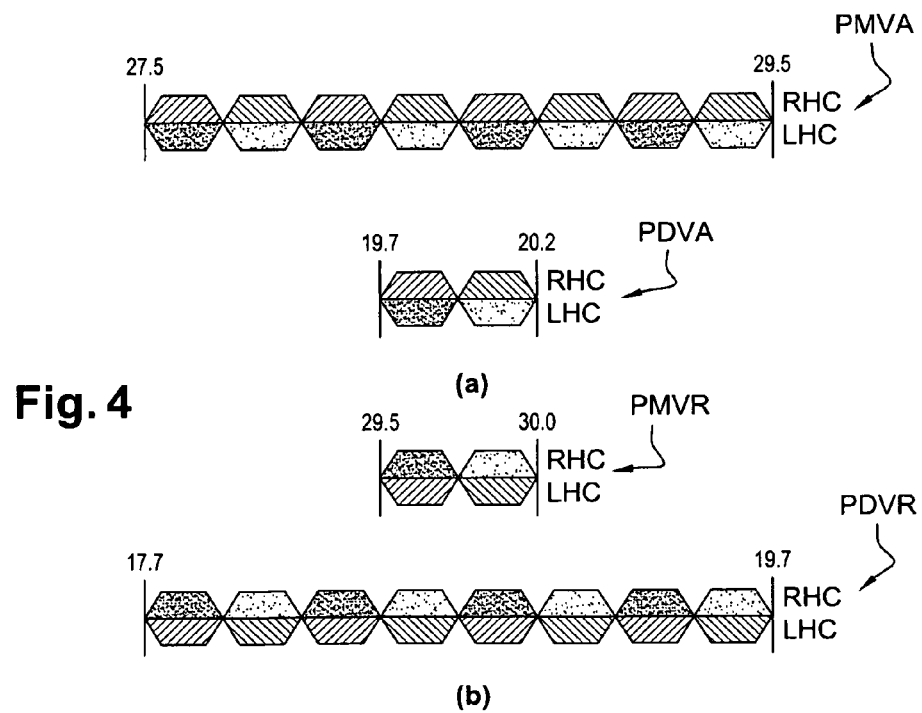
FIG. 4 illustrates a frequency plan in band Ka.
Figure 5:
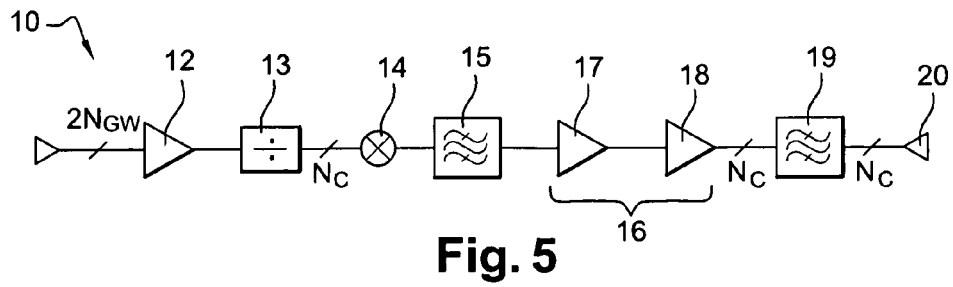
FIG. 5 is a functional block diagram of an architecture of reference payload in forward link according to the prior art.
Figure 6:
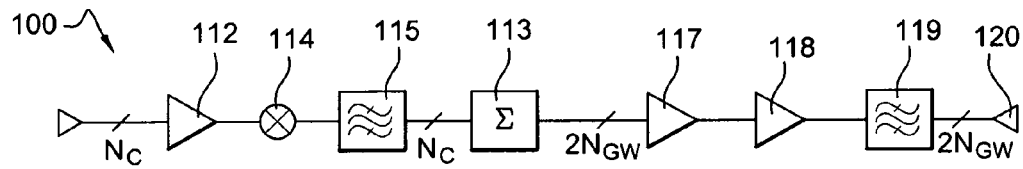
FIG. 6 is a functional block diagram of an architecture of reference payload in return link according to the prior art.

The invention concerns a telecommunication network for establishing radiofrequency links between gateways and ground terminals via a multispot telecommunication satellite. An example of such a network is represented in FIG. 1. This network includes a service zone composed of a plurality of cells each including a plurality of ground terminals. The service zone is split into N sub-zones corresponding to N time zones. We will see below that the cells served by the same gateway preferably do not belong to the same sub-zone (i.e. are distributed over the whole of the N sub-zones).

We will deal essentially with three examples in the following description:

1) in the case of Europe, the number of time zones N is equal to 3;
2) in the case of the USA, the number of time zones N is equal to 6;
3) in the case of Russia, the number of time zones N is equal to 10 (we will take 10 time zones, even though Russia in reality includes 11 time zones, the 11$^{th}$ covering a sub-zone which is sufficiently small to not be taken into consideration).

As already mentioned above, the term "capacity" is understood to mean the capacity in terms of flow of data sent towards the users (in forward link) or transmitted by the users (in return link). This capacity can be expressed in bits per second or as a variable without unit (when one is interested in its evolution in time of this capacity and not its intrinsic value). The capacity therefore corresponds to the demand of users in terms of data flow and therefore evolves as a function of time over a day of 24 h.

Figure 7:
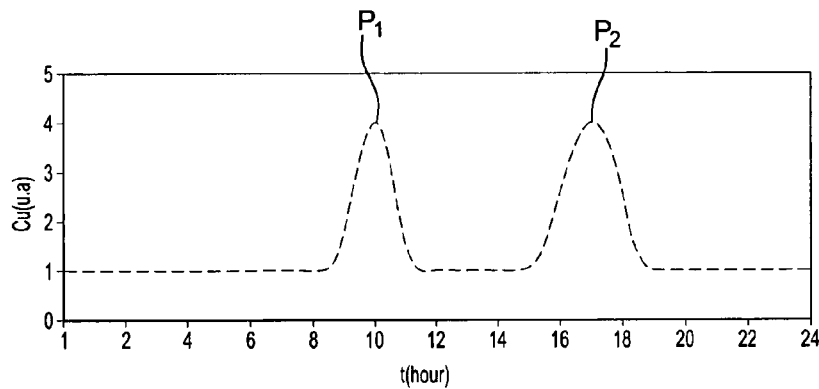
FIG. 7 represents in a simplified manner a typical capacity profile $C_u(t)$ as a function of time over a day of 24 h.

FIG. 7 represents in a simplified manner a typical capacity profile $C_u(t)$ as a function of time over a day of 24 h. The unit chosen is an arbitrary unit (a.u.). This profile $C_u$ presents:

a base capacity $C_{BG}$ (1 in a.u.) corresponding to the minimum value permanently demanded by the users;

a peak P1 (4 in a.u.) in the morning at 10 h;

a peak P2 (4 in a.u.) in the afternoon at 17 h.

The capacity $C_u(t)$ can be defined by the following relationship:

$$C_u(t) = C_{BG} + C_{AM}(t) + C_{PM}(t)$$

in which $$C_{AM}(t) = A_{AM}\left(\cos\left(\frac{2\pi(t - \delta_{AM})}{T_{AM}}\right) + 1\right)$$

$$C_{AM}(t) = A_{AM} \text{ for } -\frac{T_{AM}}{2} < t < \frac{T_{AM}}{2}$$

$$= 0 \text{ furthermore}$$

$$C_{PM}(t) = A_{PM}\left(\cos\left(\frac{2\pi(t - \delta_{PM})}{T_{PM}}\right) + 1\right) \text{ for } -\frac{T_{PM}}{2} < t < \frac{T_{PM}}{2}$$

$$= 0 \text{ furthermore}$$

$C_{BG}$, $C_{AM}(t)$, $C_{PM}(t)$ are respectively the base capacity, the capacity due to peak P1 in the morning and the capacity due to peak P2 in the afternoon.

$A_{AM}$, $A_{PM}$ are amplitude constants.

$\delta_{AM}$, $\delta_{PM}$ are the hours at which the morning and afternoon peaks take place respectively.

$T_{AM}$, $T_{PM}$ are the respective periods of the signals $C_{AM}(t)$ and $C_{PM}(t)$.

It will be noted that the peaks are of equal amplitude here, but this is not necessarily the case. By way of example, Table 2 below gives values of the parameters defined above and corresponding to those of the curve $C_u(t)$ represented in FIG. 7.

TABLE 2

| Morning | Amplitude | 1.5 |
|---|---|---|
| | Period | 3 h |
| | Peak time | 10:00 |
| Afternoon | Amplitude | 1.5 |
| | Period | 4 h |
| | Peak time | 17:00 |
| Minimum base | | 1 |

Figure 8:
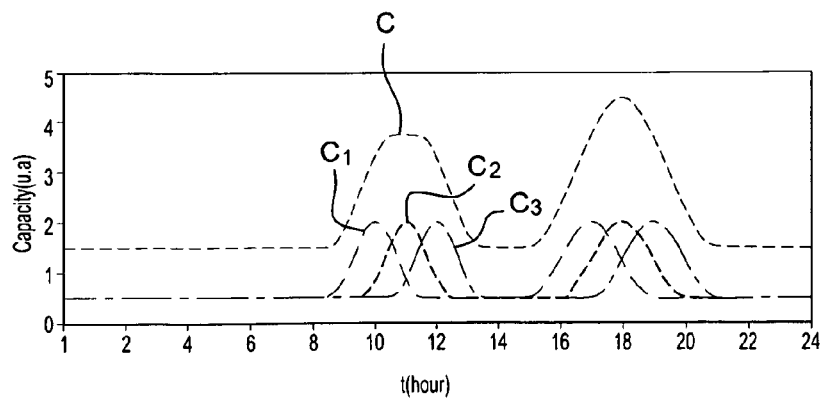
FIG. 8 represents in a simplified manner three capacity profiles $C_1(t)$, $C_2(t)$ and $C_3(t)$ of the capacities of three sub-zones corresponding to three time zones and also a capacity profile C(t) used for dimensioning a satellite supply system belonging to a telecommunication network according to the invention.

In the case of a number of time zones N is equal to 3 (case of a service zone such as Europe) with identical capacity demands over the three sub-zones corresponding to the three time zones, we can start from the hypothesis that the same capacity profile applies on each of the three sub-zones with one hour of shifting. FIG. 8 represents in a simplified manner the three identical profiles $C_1(t)$, $C_2(t)$ and $C_3(t)$, but shifted by one hour, with capacities of the three sub-zones corresponding to the three time zones. These three profiles are identical to the profile $C_u(t)$ represented in FIG. 7. In the known networks of the prior art, the supply system (essentially the solar panels and the batteries) of the satellite is dimensioned to supply the amplifiers of the transponder of the satellite so that the latter respond simultaneously to a capacity demand corresponding to three times the value of the maximum peak of each profile: in the case of FIG. 8, this signifies that a supply system according to the prior art is dimensioned to respond to a maximum capacity of 12 a.u. (3×4 a.u.).

In practice, the capacity C(t) corresponds to the sum of the N=3 profiles $C_i(t)$ so that one obtains a global capacity $$C(t) = \sum_{1}^{N} C_i(t)$$

This profile C(t) is likewise represented in FIG. 8. The profile C(t) presents a first peak in the morning at 11 h equal to 7.5 a.u. and a second peak in the afternoon at 18 h equal to 9.5 a.u. It is therefore found that the highest peak at 9.5 a.u. remains much inferior to the sum of the three peaks equal to 12 a.u. The network according to the invention starts from the fact that the supply systems used in the known networks are over-dimensioned with respect to the actual demand and draws profit from the fact that the peaks of capacity are produced at different moments; consequently, the highest operational capacity equal to 9.5 is equal to 75% of the capacity corresponding to the sum of the peak capacities.

Let us take the hypothesis that the amplifiers of the transponder are formed by travelling wave tube amplifiers (TWTA). A TWTA is composed of a travelling wave tube (TWT) and supply means EPC (Electronic Power Conditioning). The amplifier transforms the supplied continuous power, via a satellite bus, by the supply system of the satellite in radiofrequency power. Designating by $P_{DC}$ the consumed continuous power, by $P_{RF}$ the radiofrequency power of the output signal of the amplifier, by η the output of the amplifier and $P_{thermal}$ the power due to the thermal dissipation in the tube, one has the following two relationships (disregarding the power of the input signal in so far as the amplifiers concerned here are high gain amplifiers, i.e. >20 dB):

$$P_{DC} = P_{RF} + P_{thermal}$$

and $$P_{RF} = \eta \cdot P_{DC}$$

It should be noted that the output η is only defined for the amplifier functioning at saturation (i.e. for the power peak $P_{RF,sat}$ delivered): this functioning point is designated by stating that one is 0 dB in back-off.

Hence, at saturation, one can express the consumed continuous power $P_{DC,sat}$ by the relationship:

$$P_{DC,sat} = \eta P_{DC,sat} + P_{thermal,sat}$$

With the power due to the thermal dissipation in the tube $P_{thermal}$ being able to be considered as quasi constant, one can therefore express the consumed continuous power $P_{DC,OBO}$ in back off in relation to the saturation by the following relationship:

$$P_{DC,OBO} = \alpha P_{RF,sat} + P_{thermal,sat}$$

where α represents a back off factor (for example α is equal to 0.5 functioning at 3 dB back off).

This latter relationship can be rewritten in the following manner:

$$P_{DC,OBO} = P_{DC,sat} - (1-\alpha) P_{RF,sat}$$

Therefore, one deduces:

$$P_{DC,OBO} = P_{DC,sat} - (1-\alpha)\eta P_{DC,sat}$$
$$= P_{DC,sat}(1 - \eta + \alpha\eta)$$

The factor α will depend both on the number of carriers amplified by the amplifier TWTA but equally on the functioning according to a maximum capacity being demanded (peak capacity period) or a minor capacity being demanded (period outside the peak capacity). The factor α can therefore be expressed as the product of two factors $\alpha_0$ and $\alpha_1$. The factor $\alpha_0$ is determined by the structure of the signal at the point of maximum functioning: if the signal is a mono-carrier, $\alpha_0$ is equal to 1 and if the signal is a multi-carrier, $\alpha_0$ is less than 1. The factor $\alpha_1$ is determined by the capacity demand: in the case of maximum capacity demand, $\alpha_1$ is equal to 1. When the capacity demand is not at a maximum, $\alpha_1$ is less than 1. Consequently, it can be written that:

the continuous power consumed $P_{DC,OBO,C}$ by an amplifier for a maximum capacity C ($\alpha_1=1$) is given by the relationship:

$$P_{DC,OBO,C} = P_{DC,sat}(1-\eta+\alpha_0\eta). \quad 1)$$

the continuous power consumed $P_{DC,OBO}$ by an amplifier for a capacity $\alpha_1 C$ ($\alpha_1 < 1$) is given by the relationship:

$$P_{DC,OBO} = P_{DC,sat}(1-\eta+\alpha_0\alpha_1\eta). \quad 1)$$

For a set of N amplifiers TWTA operating at different functioning points, one therefore has:

$$P_{DC,OBO} = \sum_{n=1}^{N} P_{DC,sat}(1-\eta+\alpha_0\alpha_n\eta)$$
$$= P_{DC,sat}\left(N - \eta N + \alpha_0\eta\sum_{n=1}^{N}\alpha_n\right)$$
$$= P_{DC,sat}\left(N - \eta N + \alpha_0\eta\sum_{n=1}^{N}\alpha_n\right)$$
$$= P_{DC,sat} N(1 - \eta + \alpha_0\eta\overline{\alpha})$$

$\overline{\alpha}$ representing the mean value of the factor $\alpha_1$ on the whole of the N amplifiers TWTA.

One deduces from this the ratio of the power $P_{DC,OBO}$ consumed by the N amplifiers TWTA to respond to a capacity $\overline{\alpha}$ C on the power consumed by the amplifiers TWTA so that the latter respond to a maximum capacity $$\frac{P_{DC,OBO}}{NP_{DC,sat}} = 1 - \eta + \alpha_0\eta\overline{\alpha}. \quad \text{(relation 1)}$$

Figure 9:
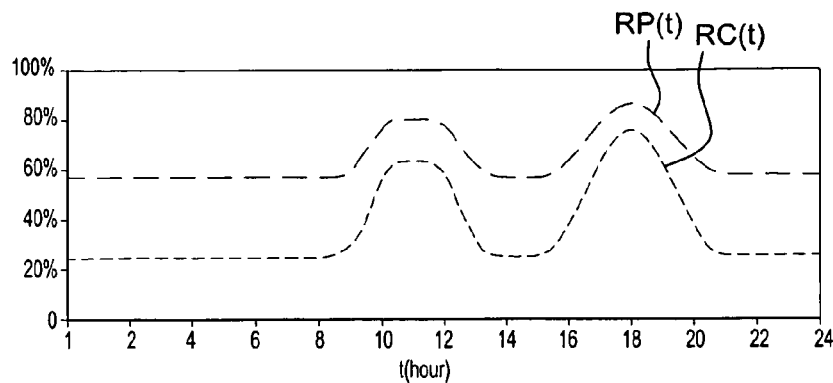
FIG. 9 represents a normalised capacity curve RC(t) corresponding to the capacity C(t) of FIG. 8 and also an associated normalised power curve RP(t)

FIG. 9 represents a normalised capacity curve RC(t) corresponding to the ratio of C(t) on the sum of the peak capacities: in a first approximation, this ratio can be assimilated to the value $\overline{\alpha}$ defined above. A peak is indeed observed at 62.5% (corresponding to the ratio 7.5/12) and a peak at 75% (corresponding to the ratio 9.5/12), 12 representing the sum of the peak capacities $C_{1max}+C_{2max}+C_{3max}$. One can deduce from this normalised capacity RC(t), the ratio RP(t) between the maximum continuous power which the supply system must deliver to supply the amplifiers of the transponder of the satellite so that the latter respond to the capacity C(t) and the continuous power which the supply system must deliver to supply the amplifiers of the transponder of the satellite so that the latter respond to the sum of the capacity peaks in the hypothesis where the amplifiers TWTA provide 100% capacity at saturation ($\alpha_0=1$). This ratio RP(t) can be assimilated in first approximation to the ratio $$\frac{P_{DC,OBO}}{NP_{DC,sat}}$$

provided by the relation 1. It can be noted that the ratio RP(t) does not exactly follow the ratio RC(t) (i.e. the reduction of capacity is greater than the reduction of power). This result is explained by the fact that the amplifiers TWTA function in back-off in relation to the saturation to produce the desired power RF corresponding to a demanded capacity lower than the maximum capacity. Thus, the two peaks of the capacity ratio RC(t) at 62.5% and at 75% correspond respectively to two peaks of the power ratio RP(t) at 79% and 86%. Thus, according to the invention, it is possible to use a supply system dimensioned to provide a maximum power reduced by 14% (i.e. dimensioned on the greatest peak of RC(t) in relation to the necessary power to supply the amplifiers TWTA so that the latter provide simultaneously all the three sub-zones with their capacity peak ($C_{1max}+C_{2max}+C_{3max}$). One can find substantially the ratio $RP_{max}$ of 86% by applying the relation 1 with $\alpha_0=1$, $\eta=0.6$ and $\overline{\alpha}=0,75$ ($RC_{max}$):

$$RP_{max} = 1 - 0.6 + 1 \times 0.6 \times 0.75 = 85\% \approx 86\%.$$

In the hypothesis where the amplifiers TWTA provide 100% of capacity, not being at saturation ($\alpha_0>1$), $RP_{max}$ is increased. Thus, for amplifiers TWTA providing 100% of capacity at 2 dB back-off ($\alpha_0-0.625$), the two peaks of the capacity ratio at 62.5% and at 75% therefore correspond substantially respectively to two peaks of the power ratio at 83% and 89%. In this case, according to the invention, it is possible to use a supply system dimensioned to provide a maximum power reduced by 11%.

The invention can equally be applied to amplifiers TWTA of constant efficiency: an amplifier TWTA of constant efficiency designates an amplifier which permits a variation of the dissipated thermal power $P_{thermal}$ identical to that of the output radiofrequency power $P_{RF}$, on a given back-off range (typically of 1 to 3 dB back-off). Thus, the ratio $P_{RF}/P_{thermal}$ will be constant on this range and the efficiency η previously defined will also be constant. An example amplifier TWTA of constant efficiency (also designated "flexible TWT") is described in the document "Flexible TWT Amplifier for Space Applications" (F.André et al. 2003 IEEE). If one applies the invention using amplifiers TWTA of constant efficiency functioning on a back-off range where the efficiency is effectively constant, one then obtains a power ratio identical to the capacity ratio; hence, the two peaks of the capacity ratio at 62.5% and at 75% then correspond respectively to two peaks of the power ratio at 62.5% and 75%. In this case, according to the invention, it is possible to use a supply system dimensioned to provide a maximum power reduced by 25%. The invention therefore allows in this case a saving of 25% on the energy supply system formed essentially by solar panels and batteries (saving in power delivered is expressed in a quasi identical manner in saving in mass on the supply system). The table below illustrates the case of a satellite taking on board approximately 70 amplifiers TWTA with three time zones.

TABLE 3

|  | Dry mass according to the prior art (kg) | Dry mass according to the invention(kg |
|---|---|---|
| Payload | 750 | 750 |
| Platform | 1700 | 1550 |
| Supply System | 600 | 450 |

For a supply system having an initial dry mass of 600 kg (these 600 kg correspond to an equivalent of 1.3 tonnes for the launching of this equipment, the difference between the 1.3 tonnes and the 600 kg being formed by the fuel), the invention therefore allows 150 kg to be saved on the dry mass of the satellite (i.e. 9% of the dry mass of the platform or 6% of the total dry mass of the satellite) using a supply system having a dry mass of 450 kg. From this saving in dry mass, two options are able to be envisaged:

the first option consists in having more fuel to return to the same total mass of the satellite (with the fuel) as that of a satellite in a network not using the invention. This first option allows a gain in the lifespan in the mission of the satellite. Typically, on a satellite, 150 kg of extra fuel corresponds to 3 even 4 additional years of life.

The second option consists in reducing the total mass of the satellite by 150 kg, which allows the launching mass to be reduced by 330 kg (dry mass saved owing to the invention plus necessary fuel for putting this dry mass into orbit) and by the same at the same time the cost of the satellite and the cost of launching. Such an option is particularly advantageous in the case of launching where the operator of the satellite pays as a function of the mass to be launched into orbit.

In addition, it is to be recalled that a satellite is essentially composed of two main elements which are on the one hand the payload and on the other hand the platform.

As already mentioned above, the payload of the satellite designates the part which allows it to fulfil the mission for which it was designed, i.e. for a telecommunication satellite, to ensure the reception, the processing (frequency conversion, filtering, amplification) and the re-emission of the telecommunication signals issued from the gateway. The payload essentially includes the antennae of the satellite and the transponders.

The platform principally groups all the functions of alignment control, propulsion, thermal regulation and supply of the satellite. The alignment control equipment is composed of pickups which allow the ground to be informed of the orientation of the satellite in space to keep it correctly oriented towards the earth. The piloting is carried out by a generally chemical propulsion system. Finally, the energy supply of the satellite is ensured by a supply system composed essentially of photovoltaic cells which convert the energy of the sunlight into electricity and of batteries necessary for supplying the satellite during eclipse phases when the rays of the sun are blocked by the earth. The platforms are generic platforms which are then adapted to a specific mission: different classes of platforms therefore exist depending in particular on the equipment of the payload, the supply needs of the payload and the launching constraints. The dimensioning of certain components of the platform is totally independent of the size of the payload: this is the case, for example, for the alignment control functions. Other components are dimensioned for a range of supply needs of the payload: this is the case for example for the supply control functions of the satellite. Finally, certain components are directly dimensioned as a function of the needs of the payload: as we have already mentioned, it is in particular the case of the supply system. Consequently it should be noted that by using the invention advantageously, it can be possible, by reducing the mass of the supply system, to pass from one class of platform to a lower class, this transition clearly entailing a considerable saving.

Figure 10:
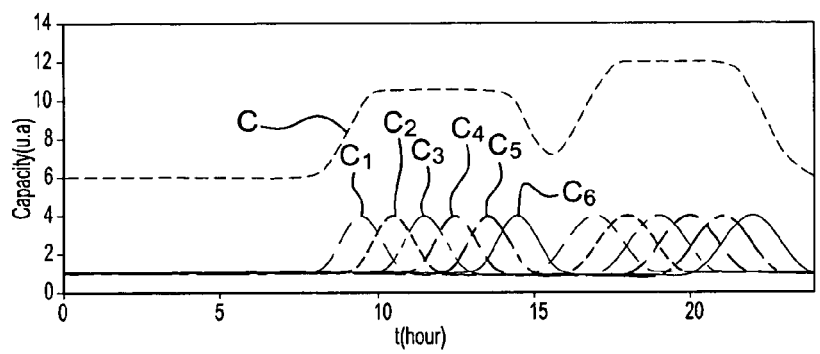
FIG. 10 represents in a simplified manner six capacity profiles $C_1(t)$, $C_2(t)$, $C_3(t)$, $C_4(t)$, $C_5(t)$, and $C_6(t)$ of the capacities of six sub-zones corresponding to six time zones and also a capacity profile C(t) used for dimensioning a satellite supply system belonging to a telecommunication network according to the invention.

FIG. 10 illustrates the case of a number of time zones N is equal to 6 (case of a service zone such as the USA) with identical capacity demands on the six sub-zones corresponding to the six time zones; as for FIG. 8, we can start from the hypothesis that the same capacity profile applies on each of the six sub-zones with one hour of shifting. FIG. 10 represents in a simplified manner the six profiles $C_1(t)$, $C_2(t)$, $C_3(t)$, $C_4(t)$, $C_5(t)$ and $C_6(t)$ which are identical but shifted by one hour, of the capacities of the six sub-zones. In the known networks of the prior art, the supply system of the satellite is dimensioned to supply the amplifiers of the transponder of the satellite so that the latter respond simultaneously to a capacity demand corresponding to six times the value of the maximum peak of each profile: in the case of FIG. 10, this signifies that a supply system according to the prior art is dimensioned to respond to a maximum capacity of 24 a.u. (6×4 a.u.).

In practice, the capacity C(t) corresponds to the sum of the N=6 profiles $C_i(t)$ such that one obtains a global capacity $$C(t) = \sum_1^N C_i(t).$$

This profile is likewise represented in FIG. 10. The profile C(t) presents a first capacity maximum in the morning equal to 10.5 a.u. and a second capacity maximum in the afternoon equal to 12 a.u. It is therefore found that the highest capacity maximum at 12 a.u. remains much lower than the sum of the six peaks equal to 24 a.u. Again, the network according to the invention starts from the fact that the supply systems used in the known networks are over-dimensioned with respect to the actual demand and draws profit from the fact that the capacity peaks occur at different moments; consequently, the highest operational capacity equal to 12 is equal to 50% of the capacity corresponding to the sum of the peak capacities $C_{1max}+C_{2max}+C_{3max}+C_{4max}+C_{5max}+C_{6max}$. It will be noted that the gain in capacity is greater for N=6 spot beams (50%) than for N=3 spot beams (75%).

Figure 11:
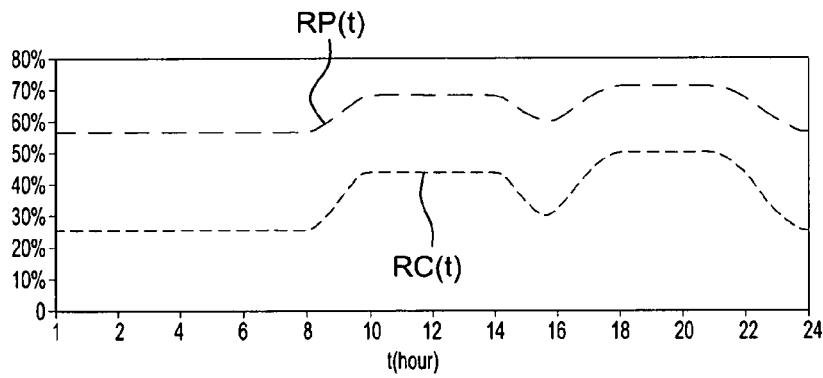
FIG. 11 represents a normalised capacity curve RC(t) corresponding to the capacity C(t) of FIG. 10 and also an associated normalised power curve RP(t)

FIG. 11 represents a normalised capacity curve RC(t) corresponding to the ratio of C(t) on the sum of the peak capacities: in a first approximation, this ratio can be assimilated to the value $\bar{\alpha}$ defined above. A peak at 43.75% can be readily observed (corresponding to the ratio 10.5/24) and a peak at 50% (corresponding to the ratio 12/24), 24 representing the sum of the peak capacities. One can deduce from this normalised capacity RC(t), the ratio RP(t) between the maximum continuous power which the supply system must deliver to supply the amplifiers of the transponder of the satellite so that the latter respond to the capacity C(t) and the continuous power that the supply system must deliver to supply the amplifiers of the transponder of the satellite so that the latter respond to the sum of the capacity peaks, in the hypothesis where the amplifiers TWTA provide 100% capacity at saturation ($\alpha_0=1$). This ratio RP(t) can be assimilated in a first approximation to the ratio $$\frac{P_{DC,OBO}}{NP_{DC,sat}}$$

provided by the relation 1.

It can be noted that the ratio RP(t) does not follow exactly the ratio RC(t) (i.e. the reduction of capacity is greater than the reduction of power). This result is explained by the fact that the amplifiers TWTA function in back-off with respect to saturation to produce the desired power RF corresponding to a demanded capacity less than the maximum capacity. Thus, the two capacity ratio peaks RC(t) at 43.75% and at 50% correspond respectively to two power ratio peaks RP(t) at 68% and 72%. Thus, according to the invention, it is possible to use a supply system which is dimensioned to provide a maximum power reduced by 28% (i.e. dimensioned on the greatest peak of RC(t)) with respect to the power necessary to supply the amplifiers TWTA so that the latter provide simultaneously the whole of the six subzones with their capacity peak ($C_{1max}+C_{2max}+C_{3max}+C_{4max}+C_{5max}+C_{6max}$). One can find substantially the ratio $RP_{max}$ of 72% by applying the relation 1 with $\alpha_0=1$, $\eta=0.6$ and $\bar{\alpha}=0.5$ ($RC_{max}$):

$$RP_{max}=1-0.6+1\times0.6\times0.5=70\%\approx72\%.$$

In the hypothesis where the amplifiers TWTA provide 100% of capacity not being at saturation ($\alpha_0>1$), $RP_{max}$ is increased. Thus, for amplifiers TWTA providing 100% of capacity at 2 DB back-off ($\alpha_0\approx0.625$), the two peaks of the capacity ratio at 43.75% and at 50% correspond then respectively to two power ratio peaks at 74% and 77%. In this case, according to the invention, it is possible to use a supply system which is dimensioned to provide a maximum power reduced by 23%.

The invention can equally be applied to amplifiers TWTA at constant efficiency. In this case, the two peaks of the capacity ratio at 43.75% and at 50% then correspond substantially respectively to two power ratio peaks at 43.75% and 50%. In this case, according to the invention, it is possible to use a supply system which is dimensioned to provide a maximum power reduced by 50%. In this case, the invention therefore allows a saving of 50% to be made on the supply system.

Figure 12:
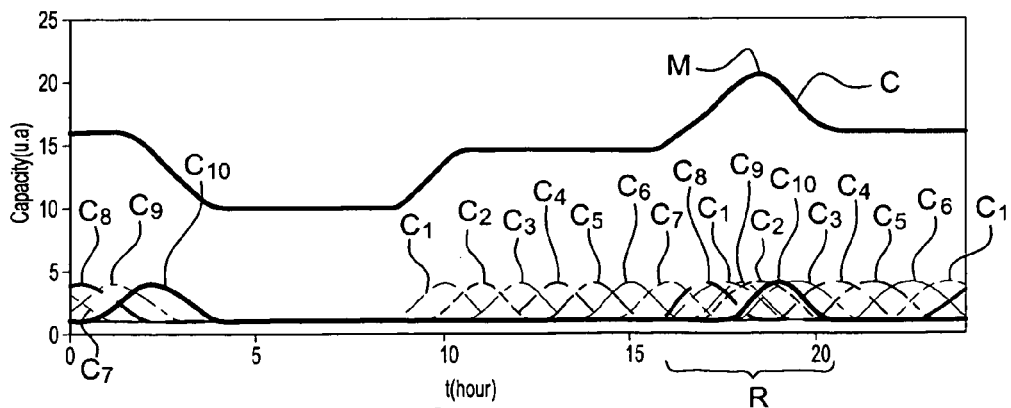
FIG. 12 represents in a simplified manner ten capacity profiles $C_1(t)$, $C_2(t)$, $C_3(t)$, $C_4(t)$, $C_5(t)$, $C_6(t)$, $C_7(t)$, $C_8(t)$, $C_9(t)$ and $C_{10}(t)$ of the capacities of ten sub-zones corresponding to ten time zones and also a capacity profile C(t) used for dimensioning a satellite supply system belonging to a telecommunication network according to the invention.

FIG. 12 illustrates the case of a number of time zones N is equal to 10 (the case of a service zone such as Russia) with identical capacity demands on the ten sub-zones corresponding to the ten time zones; it will be noted that in so far as the maximum coverage in longitude of a geostationary satellite is approximately equal to 160°, ten time zones represent substantially the maximum number of time zones which such a satellite can cover.

As for FIGS. 8 and 10, we can start from the hypothesis that the same capacity profile applies on each of the ten sub-zones with one hour of shifting. FIG. 12 represents in a simplified manner the ten profiles $C_1(t)$, $C_2(t)$, $C_3(t)$, $C_4(t)$, $C_5(t)$, $C_6(t)$, $C_7(t)$, $C_8(t)$, $C_9(t)$ and $C_{10}(t)$ which are identical but shifted by one hour, of the capacities of the ten sub-zones. In the known networks of the prior art, the supply system of the satellite is dimensioned to supply the amplifiers of the transponder of the satellite so that the latter respond simultaneously to a capacity demand corresponding to ten times the value of the maximum peak of each profile: in the case of FIG. 12, this signifies that a supply system according to the prior art is dimensioned to respond to a maximum capacity of 40 a.u. (10×4 a.u.).

In practice, the capacity C(t) corresponds to the sum of the N=10 profiles $C_i(t)$ so that one obtains a global capacity profile $$C(t) = \sum_{1}^{N} C_i(t).$$

This profile C is likewise represented in FIG. 12. The profile C(t) presents a first capacity maximum in the morning equal to 14.5 a.u. and a second capacity maximum in the afternoon equal to 16 a.u.: however, contrary to the cases of FIGS. 8 and 10 (respectively 3 and 6 time zones), the fact of having ten time zones involves a coverage R of the series of capacity peaks of the morning of capacities $C_1(t)$ to $C_{10}(t)$ with the series of capacity peaks of the afternoon of capacities $C_1(t)$ to $C_{10}(t)$ (the peak of the afternoon of the signal $C_1(t)$ takes place when the peaks of the morning of capacity $C_9(t)$ and $C_{10}(t)$ have not yet taken place). Consequently, this coverage involves the presence of a third capacity maximum M equal to 20.5 a.u. (and hence greater than the second maximum). It is found, however, that this highest maximum at 20.5 a.u. remains much lower than the sum of the six peaks equal to 40 a.u. Again, the network according to the invention starts from the fact that the supply systems used in the known networks are over-dimensioned with respect to the actual demand and draws profit from the fact that the capacity peaks occur at different moments. This covering phenomenon starts to be observed from eight time zones (N=8).

Consequently, for N=10, the highest operational capacity equal to 20.5 is equal to 51% of the capacity corresponding to the sum of the peak capacities $C_{1max}+C_{2max}+C_{3max}+C_{4max}+C_{5max}+C_{6max}+C_{7max}+C_{8max}+C_{9max}+C_{10max}$.

Figure 13:
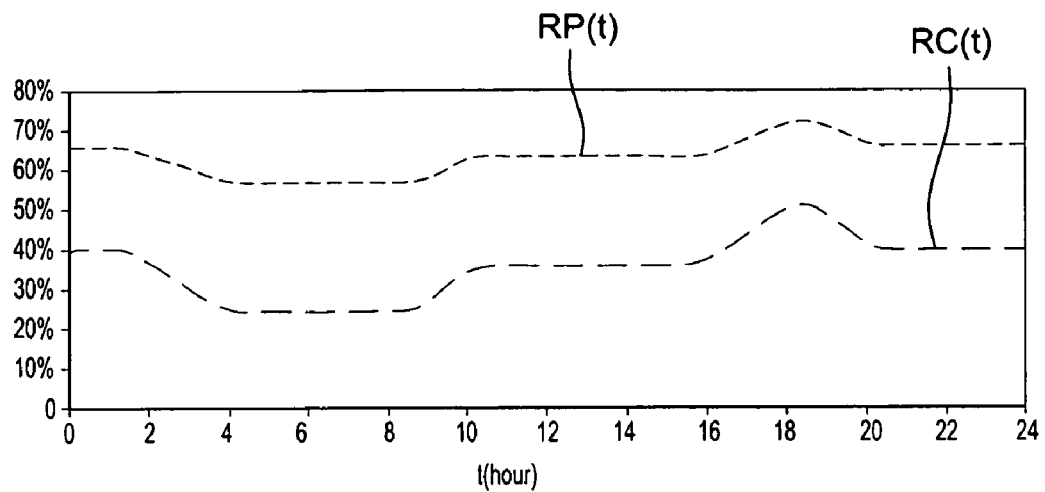
FIG. 13 represents a normalised capacity curve RC(t) corresponding to the capacity C(t) of FIG. 12 and also an associated normalised power curve RP(t)

FIG. 13 represents a normalised capacity curve RC(t) corresponding to the ratio of C(t) on the sum of the peak capacities: in a first approximation, this ratio can be assimilated to the value $\bar{\alpha}$ defined above. This time, three maximums are observed, the first at 36% (corresponding to the ratio 14.5/40), the second at 40% (corresponding to the ratio 16/40) and the third at 51% (corresponding to the ratio 20.5/40), 40 representing the sum of the peak capacities:

$$C_{1max}+C_{2max}+C_{3max}+C_{4max}+C_{5max}+C_{6max}+C_{7max}+C_{8max}+C_{9max}+C_{10max}.$$

One can deduce from this normalised capacity RC(t), the ratio RP(t) between the maximum continuous power that the supply system must deliver to supply the amplifiers of the transponder of the satellite so that the latter respond to the capacity C(t) and the continuous power that the supply system must deliver to supply the amplifiers of the transponder of the satellite so that the latter respond to the sum of the capacity peaks, in the hypothesis where the amplifiers TWTA provide 100% capacity at saturation ($\alpha_0=1$). This ratio RP(t) can be assimilated in a first approximation to the ratio $$\frac{P_{DC,OBO}}{NP_{DC,sat}}$$

provided by the relation 1.

It can be noted that the ratio RP(t) does not follow exactly the ratio RC(t) (i.e. the reduction of capacity is greater than the reduction of power). This result is explained by the fact that the amplifiers TWTA function in back-off with respect to saturation to produce the desired power RF corresponding to a demanded capacity lower than the maximum capacity. Thus, the three capacity ratio peaks RC(t) at 36%, 40% and 51% correspond respectively to three maximums of the power ratio RP(t) respectively at 64%, 66% and 72%. Thus, according to the invention, it is possible to use a supply system which is dimensioned to provide a maximum power reduced by 28% (i.e. dimensioned on the greatest peak of RC(t) in relation to the power necessary to supply the amplifiers TWTA so that the latter provide simultaneously all the three sub-zones with their capacity peak $C_{1max}+C_{2max}+C_{3max}+C_{4max}+C_{5max}+C_{6max}+C_{7max}+C_{8max}+C_{9max}+C_{10max}$.

One can find substantially the ratio $RP_{max}$ of 72% by applying the relation 1 with $\alpha_0=1$, $\eta=0.6$ and $\bar{\alpha}=0.51$ ($RC_{max}$):

$RP_{max}=1-0.6+1\times0.6\times0.51=70.6\%\approx72\%$.

In the hypothesis where the amplifiers TWTA provide 100% of capacity not being at saturation ($\alpha_0>1$), $RP_{max}$ is increased. Thus, for amplifiers TWTA providing 100% capacity at 2 dB back-off ($\alpha_0\approx0.625$), the three peaks of the capacity ratio RC(t) at 36%, 40% and 51% correspond respectively to three maximums of the power ratio RP(t) respectively at 71%, 73% and 78%. In this case, according to the invention, it is possible to use a supply system which is dimensioned to provide a maximum power reduced by 22%.

The invention can equally apply to amplifiers TWTA of constant efficiency. In this case, according to the invention, it is possible to use a supply system dimensioned to provide a maximum power reduced by 49%.

The analysis made with regard to FIGS. 8 to 13 therefore allows the advantageous use of the fact that the amplifiers of the payload never supply simultaneously the whole of the sub-zones each corresponding to a time zone with their maximum capacity value $C_{imax}$ (i varying from 1 to N).

Figure 14:
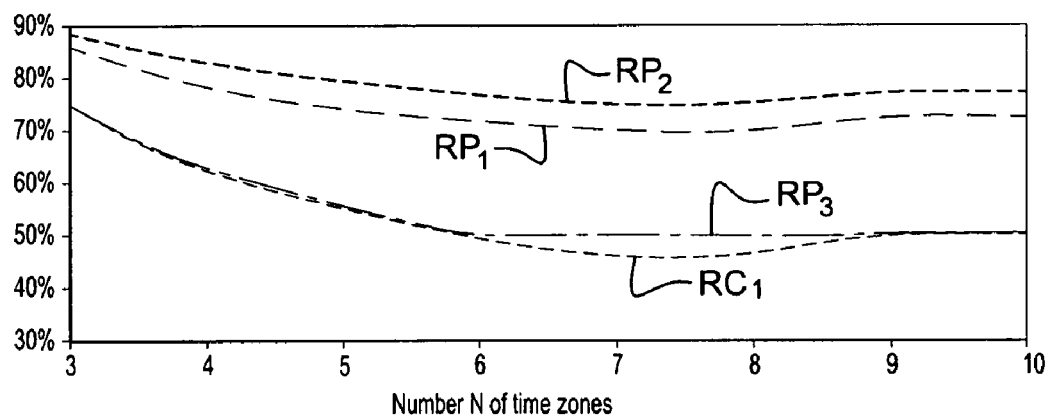
FIG. 14 represents the evolution as a function of the number N of time zones of the maximum normalised capacity and also maximum power ratios according to the type of amplifier used.

FIG. 14 represents the maximum normalised capacity RC1 (corresponding to the maximum capacity ratio on the sum of the peak capacities) as a function of the number N of time zones: as we have seen with reference to FIGS. 9, 11 and 13, this ratio RC1 is 75% for N=3, 50% for N=6 and 51% for N=10. More generally, one can observe the decrease of RC1 for the number N of time zones varying from N=3 to N=7 included, RC1 varying from 75% to 46%. One then observes a rise between N=7 and N=9 then a plateau at approximately 51% from N=9. As we have explained above, this rise and this plateau are explained by the coverage between the series of capacity peaks in the morning and in the afternoon. The suppression of one of the two series of peaks thus therefore involves a decrease of RC1 as a function of N (beyond N=7) and suppresses the rise and the plateau.

FIG. 14 likewise represents the evolution as a function of the number N of time zones of the maximum ratio RP1 between the maximum continuous power which the supply system must deliver for supplying the amplifiers of the transponder of the satellite so that the latter respond to the capacity and the continuous power which the supply system must deliver for supplying the amplifiers of the transponder of the satellite so that the latter respond to the sum of the capacity peaks, in the hypothesis where the amplifiers TWTA provide 100% capacity at saturation: as we have seen with reference to FIGS. 9, 11 and 13, this ratio RP1 is 86% for N=3, 72% for N=6 and 72% for N=10. More generally, one can observe the decrease of RP1 for the number N of time zones varying from N=3 to N=7 included, RP1 varying from 86% to 69%. One then observes a rise between N=7 and N=9 then a plateau at approximately 72% from N=9. The decrease between N=3 and N=7 is explained by a reduction in power varying from 14 to 31%.

FIG. 14 likewise represents the evolution as a function of the number N of time zones of the maximum ratio RP2 between the maximum continuous power which the supply system must deliver for supplying the amplifiers of the transponder of the satellite so that the latter respond to the capacity and the continuous power which the supply system must deliver for supplying the amplifiers of the transponder of the satellite so that the latter respond to the sum of the capacity peaks, for amplifiers TWTA providing 100% capacity at 2 dB in back-off: as we have seen with reference to FIGS. 9, 11 and 13, this ratio RP2 is 89% for N=3, 77% for N=6 and 78% for N=10. More generally, one can observe the decrease of RP2 for the number N of time zones varying from N=3 to N=7 included, RP2 varying from 89% to 76%. One then observes a rise between N=7 and N=9 then a plateau at approximately 78% from N=9. The decrease between N=3 and N=7 is explained by a reduction in power varying from 11 to 24%.

FIG. 14 finally represents the evolution as a function of the number N of time zones of the maximum ratio RP3 between the maximum continuous power which the supply system must deliver for supplying the amplifiers of the transponder of the satellite so that the latter respond to the capacity and the continuous power which the supply system must deliver for supplying the amplifiers of the transponder of the satellite so that the latter respond to the sum of the capacity peaks, for amplifiers TWTA of constant efficiency: as we have seen with reference to FIGS. 9, 11 and 13, this ratio RP3 is 75% for N=3, 50% for N=6 and 51% for N=10. More generally, one can observe the decrease of RP3 for the number N of time zones varying from N=3 to N=7 included, RP3 varying from 75% to 50%. One then observes a rise between N=7 and N=9 then a plateau at approximately 51% from N=9. The decrease between N=3 and N=7 is explained by a reduction in power varying from 25 to 50%. It will be noted that the evolution of the ratio RP3 is substantially the same as that of the capacity ratio RC1: this result is logical in so far as the amplifiers function with constant efficiency. The slight differences observed between the two curves are explained by the fact that this type of amplifier functions at constant efficiency on a given back-off range (typically 3 dB); hence, if the amplifiers must function on a greater back-off range (typically 6 dB), the curve RP3 can distance itself slightly from the curve RC1.

It will be noted that the implementation of a network according to the invention therefore permits a functioning at a maximum power delivered by the weaker supply system. To maintain the same rate of errors (and hence the same quality of service) one can either reduce the spectral density or reduce the rate of symbols transmitted and introduce a higher redundancy at the level of coding and/or a higher modulation order (number of bits per symbol transmitted).

The invention can equally have an impact on the ground network. The radiofrequency links are established between a plurality of gateways ("gateways") and a service zone including N sub-zones each associated with a time zone. The invention therefore finds a particularly interesting application when the cells served by the same gateway are distributed on the N sub=zones (i.e. are not in the same sub-zone). Consequently, in so far as the capacity peaks are shifted with regard to time for each sub-zone, the cells served by the same gateway will not have a need for maximum capacity simultaneously. Consequently the radiofrequency link established between a gateway and the cells served by this station will never see the sum of the traffic peaks; it is therefore possible to dimension the ground network so that the latter does not function for a capacity equal to the sum of the peak capacities but for a capacity lower than this sum of peak capacities. Such a dimensioning involves in particular a reduction in the quantity of optical fibres which are used (in the case of a fibre optic network) and has a direct impact on the cost of the ground network.

Of course, the invention is not limited to the form of embodiment which has just been described.

Thus, the invention has been described more particularly in the case of an amplifier formed by a CAMP followed by a TWTA. It will be noted, however, that the invention applies equally to the case of an SSPA amplifier or equipment of the MPA type.

Furthermore, as already mentioned above, even if the invention is applied more particularly to the case of sub-zones distributed on different time zones, it is equally possible to use a network according to the invention for sub-zones with users having different habits or lifestyles from one sub-zone to the other so that the capacity profiles are different and the peaks of these profiles are shifted with regard to time.

The invention claimed is:

1. A method for dimensioning the supply system belonging to a telecommunication network for establishing radiofrequency links between at least one gateway and ground terminals via a telecommunication satellite having several spot beams, designated as a multispot satellite, the telecommunication network including a service zone including a plurality of cells each including a plurality of ground terminals, the service zone being split into N sub-zones, N being an integer strictly greater than 1, each sub-zone having a capacity profile evolving in time over a given period and presenting a maximum value, the maximum values of each of the capacities being shifted with regard to time, and a multispot satellite including: a transponder including an amplification device for amplifying signals emitted by the gateway on a forward link and signals emitted by the cells on a return link, and a continuous power supply system of the amplification device, the supply system including means for supplying the amplification device providing the whole of the sub-zones with their respective capacity profile evolving over the given period, the maximum continuous power delivered by the supply system being lower than the continuous power which the amplification device would consume to provide simultaneously the whole of the sub-zones with their maximum capacity value, the N capacity profiles being defined by a curve $C_i(t)$ with i varying from 1 to N and t evolving on the given period, the method comprising the following steps:

summing the N profiles $C_i(t)$ to obtain a global capacity $$C(t) = \sum_{1}^{N} C_i(t);$$

determining a maximum value $C_{max}$ of the global capacity profile C(t);

determining the maximum continuous power delivered by the supply system, the maximum continuous power being greater than or equal to the continuous power which the amplification device would consume to provide simultaneously the service zone with the maximum value $C_{max}$.

2. The method according to claim 1 wherein each of the N sub-zones corresponds to a time zone, the given period being a period of 24 hours.

3. The method according to claim 2 wherein each of the N sub-zones has a capacity profile adapted to the lifestyle of the population using the ground terminals of the said sub-zone.

4. The method according to claim 2 wherein the amplification device includes a plurality of travelling wave tube amplifiers, each of the said amplifiers functioning at saturation when required to provide a maximum capacity.

5. The method according to claim 2 wherein the amplification device includes a plurality of travelling wave tube amplifiers, each of the said amplifiers functioning in back-off mode with respect to its saturation mode when required to provide a maximum capacity.

6. The method according to claim 2 wherein the amplification device includes a plurality of travelling wave tube amplifiers with constant efficiency.

7. The method according to claim 2 wherein the forward and return links are radiofrequency links and are established between a plurality of gateways and the service zone so that the cells served by the same gateway are distributed on the N sub-zones.

8. A multispot satellite comprising a supply system dimensioned by the method according to claim 1.

* * * * *